(12) United States Patent
Bernauer

(10) Patent No.: US 10,326,289 B2
(45) Date of Patent: Jun. 18, 2019

(54) RECHARGEABLE DEVICE WITH SHORT CIRCUIT PREVENTION

(71) Applicant: Philip Morris Products S.A., Neuchatel (CH)

(72) Inventor: Dominique Bernauer, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 147 days.

(21) Appl. No.: 15/502,053

(22) PCT Filed: Jul. 20, 2015

(86) PCT No.: PCT/EP2015/066576
§ 371 (c)(1),
(2) Date: Feb. 6, 2017

(87) PCT Pub. No.: WO2016/023711
PCT Pub. Date: Feb. 18, 2016

(65) Prior Publication Data
US 2017/0229885 A1 Aug. 10, 2017

(30) Foreign Application Priority Data
Aug. 14, 2014 (EP) .................................... 14180991

(51) Int. Cl.
*H02J 7/00* (2006.01)
*A24F 47/00* (2006.01)
(Continued)

(52) U.S. Cl.
CPC ............ *H02J 7/0031* (2013.01); *A24F 15/18* (2013.01); *A24F 47/008* (2013.01);
(Continued)

(58) Field of Classification Search
USPC ................................................ 320/124–136
See application file for complete search history.

(56) References Cited

U.S. PATENT DOCUMENTS

| 5,539,299 A | 7/1996 | Fernandez et al. |
| 6,031,702 A | 2/2000 | Williams |

(Continued)

FOREIGN PATENT DOCUMENTS

| CN | 101076766 A | 11/2007 |
| CN | 102570412 A | 7/2012 |

(Continued)

OTHER PUBLICATIONS

Extended European Search Report dated Oct. 16, 2014 in Patent Application No. 14180991.3.

(Continued)

*Primary Examiner* — Binh C Tat
(74) *Attorney, Agent, or Firm* — Oblon, McClelland, Maier & Neustadt, L.L.P.

(57) ABSTRACT

A rechargeable handheld electrically operated smoking device is provided, including a rechargeable power source; a first charging contact connected to the power source by a MOSFET voltage-controlled switch having a source, drain, and gate terminals; an operational amplifier including a non-inverting input connected to the source terminal, an inverting input connected to the drain terminal, and an output connected to the gate terminal; and a second charging contact connected to the power source, the switch being configured to prevent current flow between the first charging contact and the power source through the switch when a voltage difference therebetween is lower than a first threshold voltage, the device being configured to amplify a voltage difference between the source and drain terminals and apply it to the gate terminal, closed loop feedback is applied to the inverting input, and a biasing resistor is connected between the inverting input and electrical ground.

7 Claims, 2 Drawing Sheets

(51) Int. Cl.
*A24F 15/18* (2006.01)
*H01M 4/58* (2010.01)
*H01M 10/0525* (2010.01)
*H01M 10/44* (2006.01)

(52) U.S. Cl.
CPC ..... *H01M 4/5825* (2013.01); *H01M 10/0525* (2013.01); *H01M 10/44* (2013.01); *H02J 7/0045* (2013.01); *H02J 7/0081* (2013.01); *H01M 2220/30* (2013.01)

(56) References Cited

U.S. PATENT DOCUMENTS

| | | |
|---|---|---|
| 2002/0001745 A1 | 1/2002 | Gartstein et al. |
| 2002/0167771 A1 | 11/2002 | Kamiya |
| 2004/0108837 A1* | 6/2004 | Lai ................. H02J 7/0055 320/137 |
| 2006/0120069 A1* | 6/2006 | West ................. F21L 4/005 362/157 |
| 2007/0064354 A1 | 3/2007 | West |
| 2008/0239603 A1 | 10/2008 | Bruce et al. |
| 2009/0284170 A1 | 11/2009 | West |
| 2010/0013394 A1 | 1/2010 | West |
| 2014/0225573 A1* | 8/2014 | Watanabe ........... H02J 7/04 320/155 |
| 2015/0181942 A1 | 7/2015 | Holzherr et al. |

FOREIGN PATENT DOCUMENTS

| | | |
|---|---|---|
| CN | 103001179 A | 3/2013 |
| CN | 101002372 A | 7/2017 |
| DE | 196 35 332 A | 3/1998 |
| EP | 0 687 067 A | 12/1995 |
| EP | 2701268 A1 | 2/2014 |
| JP | 8-96779 A | 4/1996 |
| JP | 2005/198369 A | 7/2005 |
| RU | 2472270 C2 | 1/2013 |
| WO | 96/13890 A1 | 5/1996 |

OTHER PUBLICATIONS

International Preliminary Report on Patentability dated Dec. 15, 2016 in PCT/EP2015/066576 filed Jul. 20, 2015.
"TPS2412 (Active) N+1 and OR-ing Power Rail Controller" www.ti.com/product/tps2412, copyright 1995-2016, pp. 1-3.
"Reverse Current/Battery Protection Circuits" Texas Instruments, Application Report SLVA 139, Jun. 2003, pp. 1-2 cover page.
International Search Report dated Oct. 7, 2015, in PCT/EP2015/066576, filed Jul. 20, 2015.
Russian Notice of Allowance with English translation dated on Feb. 20, 2019 in corresponding Russian Patent Application No. 2017108156, citing document AO therein (11 pages).
Chinese Office Action and Search Report with English translation dated on Feb. 22, 2019 in corresponding Chinese Patent Application No. 201580042977.2, citing documents AO and AP therein (16 pages).

* cited by examiner

RECHARGEABLE DEVICE WITH SHORT CIRCUIT PREVENTION

The present disclosure relates to short circuit protection for rechargeable electrical devices having exposed charging contacts. The disclosure relates in particular to handheld, electrically operated smoking devices in which any short circuit protection is desirably small and draws minimal residual current during normal operation of the device.

Short circuit protection is well known for rechargeable electrical devices with exposed electrical contacts. For devices using lithium ion batteries, for example, short circuit protection is desirable to prevent overheating of the batteries.

The simplest and most common form of short circuit protection is the connection of one or more rectifier diodes between charging contacts. However, these diodes have a forward voltage drop of between 300 and 800 mV and so result in significant energy loss during charging. In a typical, handheld device, protection diodes might account for 10% of the charging voltage.

U.S.2006/0120069 discloses a short circuit protection circuit using a MOSFET having a predictable voltage drop. However, the circuit disclosed in U.S.2006/0120069 is not suitable for all battery chemistries because of the time it takes for the short circuit prevention circuit to be triggered. In particular, lithium iron phosphate batteries have a relatively low internal resistance which means that very high currents can flow even in the very short period it takes for the short circuit prevention circuit of U.S.2006/0120069 to trigger.

There is a need for short circuit protection for rechargeable devices that is low power, small and inexpensive, and suitable for all battery chemistries.

In one aspect, there is provided a rechargeable, handheld electrically operated smoking device comprising: a rechargeable power source; a first charging contact connected to the rechargeable power source by a voltage controlled switch; and a second charging contact connected to the rechargeable power source, wherein the voltage controlled switch is configured to prevent current flow between the first electrical contact and the rechargeable power source through the switch when a voltage difference between the first charging contact and the rechargeable power source is lower than the first threshold voltage.

This arrangement allows for short circuit protection in a manner that is both small and draws relatively little power when compared to a rectifier diode.

The voltage controlled switch may comprise a metal-oxide-semiconductor field effect transistor (MOSFET). The MOSFET may be a P-channel MOSFET. Furthermore, because the default condition for the switch is an off state, preventing the flow of current through the switch, and a threshold voltage difference is required to turn the switch on, there is not the problem of potentially damaging current flow through the switch in a period between a short circuit occurring and the switch being triggered.

The MOSFET has source terminal, a drain terminal and a gate terminal, and the device may be configured to amplify a voltage difference between the source terminal and the drain terminal and apply it to the gate terminal. Advantageously, the device is configured to amplify the voltage difference between the source terminal and the drain terminal with a gain sufficient to operate the MOSFET in a saturated mode when a normal charging current is applied to the source terminal for charging the rechargeable power source. This ensures minimal power losses as a result of the resistance of the MOSFET during charging.

The device may comprise an operational amplifier with one input connected to the source terminal, another input connected to the drain terminal, and an output connected to the gate terminal. A non-inverting input of the operational amplifier may be connected to the source terminal and an inverting input of the operational amplifier is connected to the drain terminal.

A closed loop feedback may be applied to the inverting input of the operational amplifier to provide a required voltage gain.

The device may further comprise a biasing resistor connected between the inverting input of the operational amplifier and electrical ground. The biasing resistor may ensure that the MOSFET is blocked when no charging voltage is applied to the electrical contacts.

The device may further comprise a resistor connected between the output of the operational amplifier and the source terminal. This resistor ensures that the gate voltage of the MOSFET is close to the source voltage and so the MOSFET remains blocked even if the operational amplifier is disabled.

The second charging contact may be connected to electrical ground.

The device may further comprise a plurality of data contacts.

The rechargeable power source may be a lithium ion battery, and in particular, a lithium iron phosphate battery.

The device is a handheld, electrically operated smoking device. For this type of device it particularly important for electronic components to be compact and low power.

In another aspect, there is provided a method for protecting a rechargeable, handheld, electrically operated smoking device having a rechargeable power source and a plurality of exposed contacts in the event of a short circuit between a first charging contact and another of the contacts, comprising providing a voltage controlled switch between the first charging contact and the rechargeable power source; and controlling the voltage controlled switch to prevent current flow between the first electrical contact and the rechargeable power source through the switch when a voltage difference between the first charging contact and the rechargeable power source is lower than the first threshold voltage.

An embodiment in accordance with the disclosure will now be described in detail, by way of example only, with reference to the accompanying drawings, in which.

Figure 1:
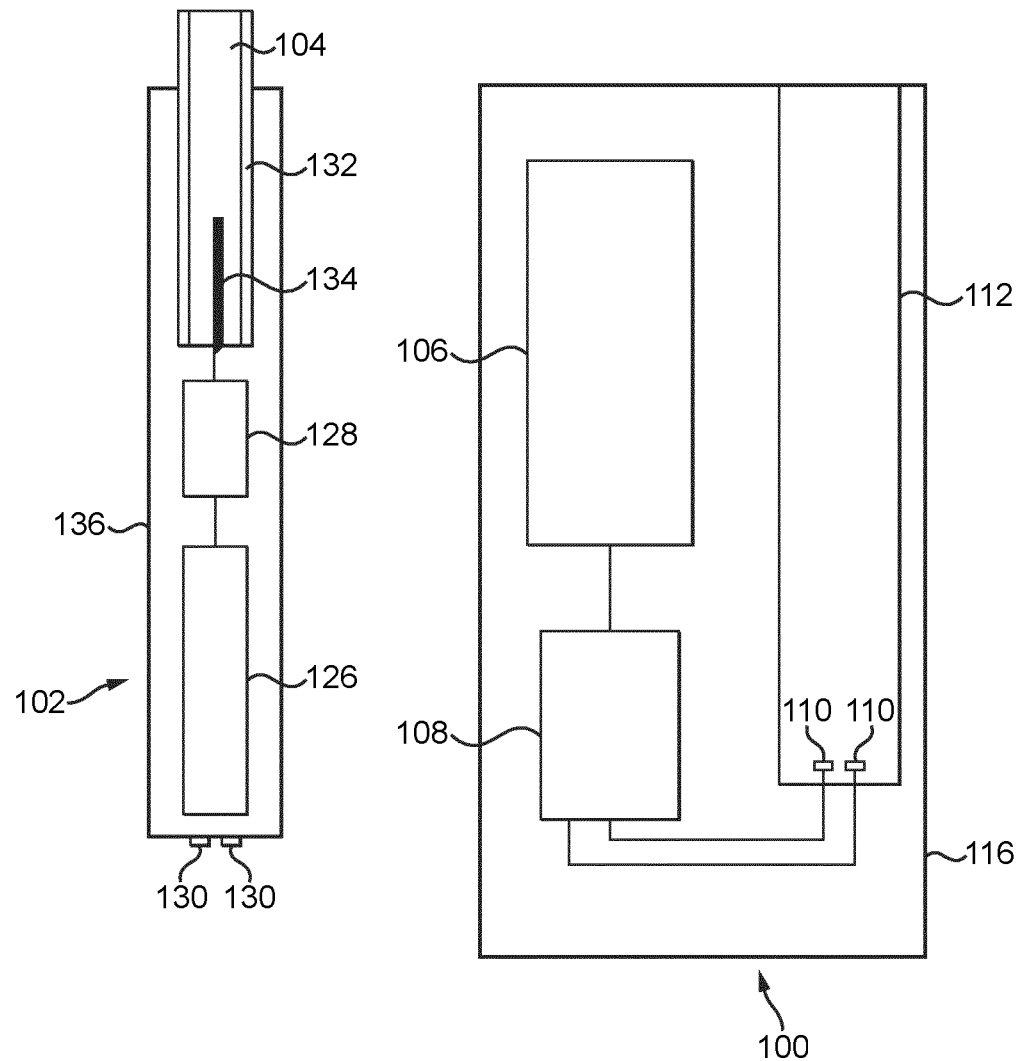
FIG. 1 is a schematic illustration of an electrically operated smoking device and an associated charging unit.

FIG. 1 shows a system comprising a charging device 100 and a rechargeable device 102 in accordance with one embodiment of the invention. The charging device 100 in this example is a charging unit for an electrically heated smoking system. The rechargeable device 102 in this example is an electrically heated aerosol-generating device adapted to receive a smoking article 104 comprising an aerosol-forming substrate. The rechargeable device includes a heater to heat the aerosol forming substrate in operation. The user inhales on a mouthpiece portion of the smoking article 104 to draw aerosol into the user's mouth. The rechargeable device 102 is configured to be received within a cavity 112 in the charging device 100 in order to recharge the power supply in the rechargeable device.

The charging device 100 comprises first battery 106, control electronics 108, and electrical contacts 110 configured to provide electrical power to a second battery in the rechargeable device and provide electrical data to electronics 128 in the rechargeable device, from the first battery 106, when the rechargeable device is in connection with the electrical contacts 110. The electrical contacts 110 are provided adjacent the bottom of a cavity 112. The cavity is configured to receive the rechargeable device 102. The components of the charging device 100 are housed within the housing 116.

The rechargeable device 102 comprises a second battery 126, secondary control electronics 128 and electrical contacts 130. As described above, the rechargeable device 102 is configured to receive a supply of power and data from the charging device when the electrical contacts 130 are in contact with the electrical contacts 110 of the charging device 100. The rechargeable device 102 further comprises a cavity 132 configured to receive the smoking article 104. A heater 134, in the form of, for example, a blade heater, is provided at the bottom of the cavity 132. In use, the user activates the rechargeable device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the rechargeable device 102 are housed within the housing 136. A rechargeable device of this type is described more fully in EP2110033 for example.

In this example, the rechargeable device 102 is an electrically heated smoking device. As such, the rechargeable device 102 is small (conventional cigarette size). The rechargeable device 102 has polygonal cross section. The external diameter of the rechargeable device may be between about 12.7 mm and about 13.65 mm measured from a flat face to an opposing flat face; between about 13.4 mm and about 14.2 mm measured from an edge to an opposing edge (that is, from the intersection of two faces on one side of the rechargeable device to a corresponding intersection on the other side); and between about 14.2 mm and about 15 mm measured from a top of the button to an opposing bottom flat face. The length of the rechargeable device is about 80 mm.

The smoking device must deliver high power over a period of just a few minutes, typically around 7 minutes for a single smoking session. The second battery may then need to be returned to the charging device 100 for recharging. The first battery 106 in the charging device is configured to hold sufficient charge to recharge the second battery 126 several times before needing recharging itself. This provides the user with a portable system that allows for several smoking sessions before recharging from a mains outlet is required.

In order to satisfy the competing requirements for the second battery 126 of small size, sufficient capacity and safe, but fast, charge and discharge, as well as acceptable lifetime, a lithium iron phosphate (LiFePO4) battery chemistry may be used, as in this example. The second battery 126 in this example has a cylindrical shape, with a diameter of 10 mm and a length of 37 mm. As an alternative, a lithium titanate battery may be used for the second battery.

The first battery 106 in the charging device 100 is a lithium cobalt oxide (LiCoO2) battery of the prismatic type. A lithium cobalt oxide battery provides a higher battery voltage than lithium iron phosphate, allowing the charging of a lithium iron phosphate battery from a single lithium cobalt oxide battery.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Alternatively, the aerosol-forming substrate may be a liquid substrate and the smoking article may comprise means for retaining the liquid substrate.

Figure 2:
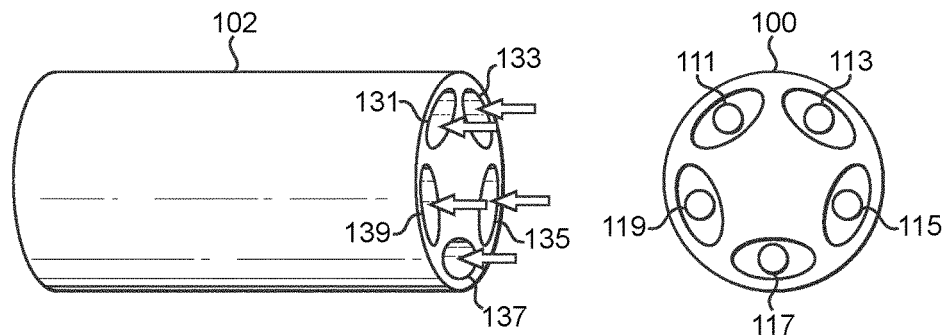
FIG. 2 is a schematic illustration an arrangement of electrical contacts on the electrically operated smoking device of FIG. 1.

FIG. 2 is a schematic illustration an arrangement of electrical contacts on the electrically operated smoking device and charging device of FIG. 1. It can be seen from FIG. 2 that the rechargeable device 102 has five symmetrically disposed electrical contacts 131, 133, 135, 137, 139. Two contacts are provided for power, two contacts are provided for data and one contact is redundant. Of the two contacts provided for power, a first contact 131 is configured to receive a charging voltage and a second contact 133 is configured as electrical ground. The charging device has a corresponding arrangement of contacts 111, 113, 115, 117, 119 for engagement with the contacts on the rechargeable device.

With an arrangement such as that shown in FIG. 2, there is potential for a short circuit between the first contact 131 and the second contact 133 or one of the data contacts 135 or 137. In order to prevent the battery from overheating in the event of a short circuit, a short circuit protection arrangement is provided.

Figure 3:
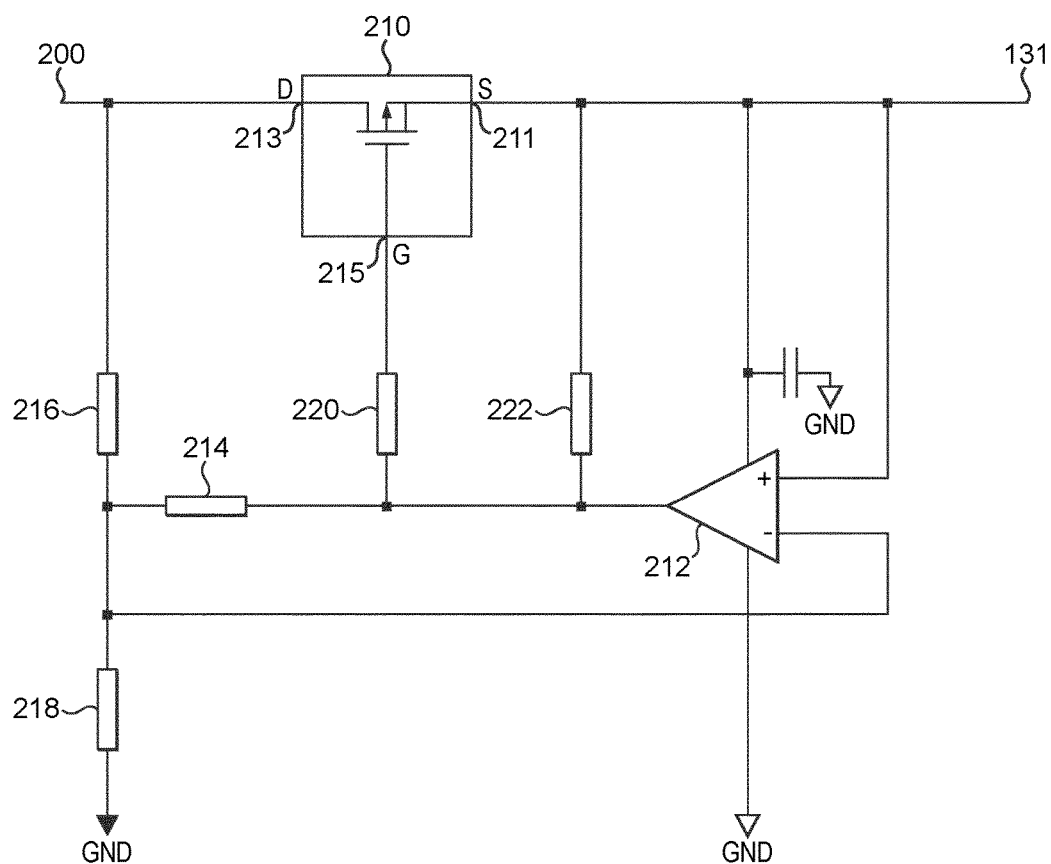
FIG. 3 is a circuit diagram of a short circuit protection circuit for a device of the type illustrated in FIGS. 1 and 2.

FIG. 3 illustrates a short circuit protection arrangement in accordance with one embodiment. The first contact 131 is indicated on the right hand side of FIG. 3. A connection to the second battery 126 is indicated by terminal 200. A P-channel MOSFET 210 is connected between the first contact 131 and the second battery 126. The source of the MOSFET 211 is connected to the first contact 131 and the drain 213 is connected to the second battery. The MOSFET 210 is "on" and will allow current to flow from the source to the drain when the voltage at the source (from the charger) is higher than at the drain (the second battery 126). If the voltage at the drain becomes equal to or greater than the voltage at the source, then no current will flow. In this embodiment the MOSFET is a DMP1022UFDE-7 MOSFET from Diodes Inc. which has a resistance in the saturated mode of 21.5 mΩ and has a package size of 2 mm×2 mm.

In this example, the system is configured for fast charging of the second battery 126, at a rate of between 8 and 10 C. To fast charge at this rate, a constant current charging phase is used, followed by a constant voltage charging phase. In order to ensure that during charging, when the MOSFET is on, it has low resistance, and so results in low energy losses, the circuit of FIG. 3 operates by amplifying the source to drain voltage and applying it to the gate 215 with a gain selected in such a way that the drop caused by MOSFET during the constant current phase is sufficient to operate the MOSFET in the saturated mode. In this example, the constant current during the constant current phase is about 1

Amp. At lower currents, less than about 0.6 Amps, during the constant voltage phase for example, the MOS-FET will operate in the linear area. The control circuitry described below and shown in FIG. 3 then regulates the voltage drop across source to drain but always with low losses.

Charging at 8 to 10 C is much faster than a typical charging rate, and it is of course possible to select components to provide a higher gain so that the MOSFET operates in the saturated mode at a much lower charging current if that is expected to be the typical mode of operation for the device.

In order to amplify the source to drain voltage an operational amplifier 212 is used. In this embodiment, the operational amplifier 212 is an OPA369 from Texas Instruments.

The gain required for the operational amplifier is determined from:
The maximum required gate voltage to benefit from low resistance of the MOSFET in the saturated mode, and
The voltage drop across source and drain.

In this embodiment, the operating gate voltage is VGS=-3.0V. The resistance of the MOSFET with this gate voltage (RDSON) has a typical value of 14 mΩ. For a nominal charging current of 1.0 A, that leads to a voltage drop of 14 mV across the MOSFET 210. The required gain of the operational amplifier 212 is therefore about:

$$G = \frac{-V_{GS}}{V_{DS}} = \frac{3.0}{0.014} = 214.3$$

The gain of the inverting amplifier is given by the ratio of resistance between resistor 214 and resistor 216.

In the event of a short circuit, charge from the rechargeable battery will flow through resistor 214. Resistor 214 is therefore selected to ensure that a low current, ideally less than 1 mA, flows in the event of a short circuit. The maximum battery voltage U is 3.65 Volts. A value of 10 kΩ is selected for resistor 214, which allows a current of:

$$I = \frac{U}{R} = \frac{3.65}{10 * 10^3} = 365 * 10^{-6} = 0.365 \text{ mA}$$

This value is below the 1 mA limit and therefore fulfils this requirement.

The resistance of resistor 216 then determines the gain. In this embodiment, a value of 47Ω is chosen to provide a gain of:

$$G = \frac{R_{214}}{R_{216}} = \frac{10 * 10^3}{47} = 212.7$$

This value of 212.7 is close to the value of 214.3 computed above. So when the rechargeable device is properly connected to the charging device, MOSFET 210 is on and has low resistance. When there is a short circuit and the voltage at charging contact 311 is pulled to ground, the MOSFET 210 is off and no current flows through it.

A small bias introduced by resistor 218 makes sure the MOSFET 210 is properly blocked when the source and drain voltage are equal, which happens when no charging voltage is applied to the contact pad, and when the battery voltage is taken to the input through resistor 214 to allow reading the battery voltage on the charging pad. The resistor 218 ensures that there is a small voltage drop across resistor 216 in this circumstance. This in turn ensures that the voltage at the negative input of the operational amplifier is lower than the voltage at the positive input of the operational amplifier by an amount that exceeds any internal offset within the operational amplifier. A resistance value of 1 mΩ is chosen for resistor 218. This ensures that the bias resistor 218 results in very little additional idle current being drawn by the circuit and ensures only a small additional voltage drop across resistor 216 during normal operation.

The gate resistor 220 prevents the operational amplifier seeing a capacitive load due to the gate capacitance of the MOSFET 210. Large capacitive loads can lead to current peaks that exceed the output short circuit current of the operational amplifier. A selected value of 1 kΩ for the gate resistor 220 keeps the current peak below the specified output short circuit current of the operational amplifier in all cases.

Resistor 222 is a pull-up resistor that ensures the gate voltage is kept close to the source voltage and therefore the MOSFET is blocked even if the output of the operational amplifier is disabled. This could happen when the battery voltage drops below the minimum power supply voltage for the operational amplifier of 1.8V. Resistor 222 has a resistance value of 10 kΩ in this example.

As explained, when the rechargeable device is properly connected to the charging device during a constant current charging phase, the gate voltage of the MOSFET 210 is sufficient for operation of the MOSFET in the saturated mode, with very low resistance and so very low power losses.

When the rechargeable device is disconnected from the charging device and there is no connection on the charging contacts, the MOSFET is off and no current can flow through it. If there is a short circuit between the charging contacts, the MOSFET remains off and no current flows through the MOSFET. In case of a short circuit, only a small current, less than 1 mA, can flow through the resistor 214.

The exemplary embodiment described above illustrates but is not limiting. In view of the above discussed exemplary embodiment, other embodiments consistent with the above exemplary embodiment will now be apparent to one of ordinary skill in the art.

The invention claimed is:

1. A rechargeable handheld electrically operated smoking device, comprising:
a rechargeable power source;
a first charging contact connected to the rechargeable power source by a metal-oxide-semiconductor field effect transistor (MOSFET) having a source terminal, a drain terminal, and a gate terminal;
an operational amplifier including a non-inverting input connected to the source terminal, an inverting input connected to the drain terminal, and an output connected to the gate terminal; and
a second charging contact connected to the rechargeable power source,
wherein the MOSFET is configured to prevent current flow between the first charging contact and the rechargeable power source through the MOSFET when a voltage difference between the first charging contact and the rechargeable power source is lower than a first threshold voltage,
wherein the device is configured to amplify a voltage difference between the source terminal and the drain terminal and to apply the voltage difference to the gate terminal, wherein closed loop feedback is applied to the inverting input of the operational amplifier, and wherein a biasing resistor is connected between the inverting input and electrical ground to ensure that the MOSFET is blocked when a voltage at the source terminal is equal to a voltage at the drain terminal.

2. The rechargeable handheld electrically operated smoking device according to claim 1, wherein the MOSFET is a P-channel MOSFET.

3. The rechargeable handheld electrically operated smoking device according to claim 1, wherein the device is further configured to amplify the voltage difference between the source terminal and the drain terminal with a gain sufficient to operate the MOSFET in a saturated mode when a normal charging current is applied to the source terminal for charging the rechargeable power source.

4. The rechargeable handheld electrically operated smoking device according to claim 1, further comprising a resistor connected between the output of the operational amplifier and the source terminal.

5. The rechargeable handheld electrically operated smoking device according to claim 1, wherein the second charging contact is connected to the electrical ground.

6. The rechargeable handheld electrically operated smoking device according to claim 1, further comprising a plurality of data contacts.

7. The rechargeable handheld electrically operated smoking device according to claim 1, wherein the rechargeable power source is a lithium-iron-phosphate battery.

* * * * *